United States Patent
Desai et al.

(10) Patent No.: US 7,240,323 B1
(45) Date of Patent: Jul. 3, 2007

(54) PLUG AND PLAY INTERFACE FOR USER ACTIONS

(75) Inventors: Munish T. Desai, Shrewsbury, MA (US); Brian R. Gruttadauria, Sutton, MA (US); Andreas L. Bauer, Maynard, MA (US)

(73) Assignee: EMC Corporation, Hopkinton, MA (US)

( * ) Notice: Subject to any disclaimer, the term of this patent is extended or adjusted under 35 U.S.C. 154(b) by 799 days.

(21) Appl. No.: 10/132,769

(22) Filed: Apr. 25, 2002

Related U.S. Application Data (63) Continuation-in-part of application No. 09/916,102, filed on Jul. 26, 2001, now abandoned.

(51) Int. Cl.
*G06F 9/44* (2006.01)

(52) U.S. Cl. .................. 717/100; 717/106; 717/110; 717/168; 717/169; 707/101; 713/100; 715/762

(58) Field of Classification Search ............. 717/121, 717/168–178, 100, 106–109; 345/760, 762–767; 713/100; 707/1, 100–102; 715/762
See application file for complete search history.

(56) References Cited

U.S. PATENT DOCUMENTS

| | | | | |
|---|---|---|---|---|
| 5,875,333 | A * | 2/1999 | Fish et al. | 717/109 |
| 6,006,279 | A * | 12/1999 | Hayes | 719/328 |
| 6,067,087 | A * | 5/2000 | Krauss et al. | 345/762 |
| 6,301,583 | B1 * | 10/2001 | Zellweger | 707/103 R |
| 6,334,101 | B1 * | 12/2001 | Hetherington et al. | 704/8 |
| 6,628,305 | B1 * | 9/2003 | Hong et al. | 345/734 |
| 2002/0063734 | A1 * | 5/2002 | Khalfay et al. | 345/744 |
| 2002/0149623 | A1 * | 10/2002 | West et al. | 345/765 |

OTHER PUBLICATIONS

Pokorny, J., 'SML functionally', 2000, Database Engineering and Applications Symposium, 2000 International, p. 266-274.*
"Microsoft Computer Dictionary" 2002, p. 154-155.*
Ganz et al. "CA-Visual Objects Developer's Guide" 1995, p. 29.*
Pokorny, J., "XML Functionally", 2000, Database Engineering and Applications Symposium, 2000 International, IEEE pp. 266-274.

* cited by examiner

*Primary Examiner*—Weng-Al T. An
*Assistant Examiner*—Jason Mitchell
(74) *Attorney, Agent, or Firm*—Krishnendu Gupta; Joel Wall; Robert Kevin Perkins (57) ABSTRACT

There is disclosed a technique for creating a plug and play interface for user actions on a graphical user interface (GUI) on a computer system such as might be used in a client-server network. A text file is prepared in XML language containing all possible user actions. The text file is read by GUI framework application software running on the operating system, and the results are stored in at least one table as Java code. The framework application software calls the Java code in response to user requests. The technique lends itself to modularization and therefore to ease of manufacture of such software plug and play interface. Such software can be easily modified at any time up to runtime.

7 Claims, 5 Drawing Sheets

MAIN MENU

FILE

NEW: FILE NEW ACTION
        SAVE: FILE SAVE ACTION     EDIT         CUT: EDIT CUT ACTION
        COPY: EDIT COPY ACTION

---

TOOLBAR

BUTTON1: BUTTON 1 ACTION
        ICON
        LABEL
    BUTTON 2: BUTTON 2 ACTION

---

OBJECT MENUS

DISK

DELETE: DISK DELETE ACTION
        PROPERTIES: DISK PROPERTIES ACTION
        GRAPH: DISK GRAPH ACTION     LUN FIGURE 3    300

PLUG AND PLAY INTERFACE FOR USER ACTIONS

CROSS REFERENCE TO RELATED APPLICATIONS

This application is a continuation in part (CIP) of U.S. patent application Ser. No. 09/916,102, filed Jul. 26, 2001, now abandoned which is hereby incorporated by reference herein in its entirety. Benefits are claimed under 35 U.S.C. § 120.

BACKGROUND OF THE INVENTION

A portion of the disclosure of this patent document contains command formats and/or other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

1. Field of the Invention

The present invention relates to graphical user interfaces (GUIs) for use in computer systems and, more particularly, relates to a plug and play technique for manifesting a GUI in a manner which, among other things, enables its software developers to implement certain user-requested or otherwise-initiated GUI code changes up to runtime, and in a modular manner which does not impact other GUI code.

2. Description of Prior Art

As virtually all users of computer terminals have experienced, user-interaction with the computer, computer system, and/or computer network (including the Internet), in addition to keyboard interaction, generally involves positioning and activating a computer screen cursor, user-controlled by manually positioning a mouse and clicking its left and right mouse buttons. This mouse-cursor "subsystem", through operation of software including user interface software (or "framework"), permits users to activate a computer screen framework of menus, buttons, dialog boxes, toolbars, etc. The activity resulting in this framework information and other computer-screen-displayed information derived from this framework can be defined as the GUI.

In GUI software development in the prior art, typically the code for operations is directly embedded into the message handler code that many user interface frameworks generate for menus, buttons, etc. Such code is compiled and linked into the overall application code module and is shipped to the customer-user in one unit. There are two main problems with this approach: (1) All code needed for the application is resident within a single module and has to be compiled and linked together. For large applications this can lead to long development times. Bug fixes in one part of the code can affect other parts of the code because there is no establishment and enforcement of boundaries between different parts of the code. (2) It is virtually impossible to add functionality on an as-needed or as-requested basis, during the development cycle or thereafter in response to developers' or users' desires, without recompiling, relinking, retesting, and reinstalling a great deal of functionally-unrelated code that should not have been affected at all by the added functionality. This is a very costly, time consuming, and wasteful repetition of code development, further running the risk of causing damage to code already in place. This is not an efficient manner in which to conduct software development.

Accordingly, software developers of complex software would like the flexibility to easily make changes to their software to effect GUI changes, in both software already supplied to users and in software still under development, without disrupting major portions of code already developed and finalized. In other words, they would like to be able to easily alter the software, which, in turn, alters the screen presentation or format, and they would like to be able to do this at any time, including after its shipment to a customer. Additionally, certain users such as, for example, major corporate purchasers of computer systems and equipment would like the flexibility to update or change available features or capabilities of GUIs supplied with their computer systems because their corporate needs change in response to their changing business conditions. This flexibility tends to be more difficult to achieve, however, as computer system performance requirements and expectations increase, whereby the software being developed, including GUI software, necessarily becomes more and more complex.

One approach that software developers have taken to simplify the software development process involves their use of object-oriented languages, such as C++ and JAVA, in writing their code. Briefly, an object, in computer software terms, is a dedicated area of memory which can be thought of as an impervious container holding both data and instructions within itself, both defining itself and its relationships to other objects in the computer system or network. An object or node can send and receive messages to and from other objects, respond and react to such messages (e.g. commands) but shall normally be impervious to internal scrutiny. For example, in a storage system (a kind of computer) each object (system object) may describe or relate to a specific tangible detail in the storage system or its processor (e.g. a fan, power switch, cache memory, power supply, disk drive interface, etc.), where these tangible objects in the storage system can send messages to each other and to other objects outside the storage system. The relationship between these specific objects in the storage system is usually visualized or characterized as a "tree" of objects. In a tree, each such object hangs off a preceding object as if in a parent-child or inheritance relationship, with many children hanging from a parent not being an atypical configuration. In addition to these tangible kinds of objects, logical units (LUNs) are other nodes or objects that can be contained within the tree. For example, a storage system object can have several LUN objects as its children which, in turn, can have various disk objects as their children, etc. These kinds of objects are generically referred to herein as "system objects" since they all relate to a system or to components within a system, whether it is a storage system, computer system, disk drive system, or some other system, and representations of these objects are typically displayed on the GUI in this tree fashion. However, other kinds of objects can also be formulated which do not relate to a system or its components per se, such as objects relating to user actions and represented on the GUI in other ways. (User actions are any commands or operations initiated by the user, such as, for example, creating a LUN or downloading new software to a disk, etc.)

Another prior art approach to simplification in software development, in general, involves the concept of modularity, where software, whether object-oriented or otherwise, having common or related functionality is grouped together for control purposes. A first group then communicates with other functionally-unrelated groups of software through well-defined interfaces. This modular approach has resulted in certain notable efficiencies. In this approach, developers are organized into appropriate teams corresponding to the various groups, thus allowing parallel development. Also, this approach allows software development to proceed in a manner in which a particular group's software can be modified without negatively impacting other groups' software. However, this approach does not address inefficiencies noted above with regard to code modification after completion of the development cycle or after shipment to a customer user.

These shortcomings and inefficiencies of prior art techniques of software development, and particularly as relating to GUI software development are addressed and overcome by the welcome arrival of the present invention.

SUMMARY OF THE INVENTION

Embodiments of the present invention include apparatus, method, system, and/or computer program product for enabling software developers with a special plug and play technique for handling code development for a product. This technique not only permits code changes during the code development cycle which do not impact other code in the product beyond a minimal and immediate code relationship, but also permits code changes after the code development cycle and at any point up to user runtime that also do not impact other code in the product beyond such minimal and immediate code relationship. In addition, even after runtime, these embodiments allow ease of modification of the code to add additional features to the product to be supplied to the user as a product upgrade/enhancement, and/or to uncensor other features previously embedded in the code but censored from user access in a manner that such user did not know that such other features existed.

In a particular aspect, embodiments of the present invention within a computer system relate to a plug and play interface for user actions. A file is established containing information about the user actions. The file is read to determine certain user actions to be implemented. The user is permitted to invoke or execute certain of those certain user actions through the user interface. The computer system can be part of a client server network.

In another aspect, embodiments of the present invention within a computer system relate to implementing a user interface. System components operate to accomplish the following: A text file is established in a memory in which all possible user actions are contained. A table is established in the memory. An application framework reads the text file to store certain user actions in the table. A minimum application requirement is established for the certain user actions. Each one of the certain user actions is compared with its respective minimum application requirement. For any of the user actions that meet the minimum requirement, it is determined if such "any" is available. And, those user actions determined as "is available" are performed.

In yet another aspect in a client-server environment, embodiments of the present invention relate to a client having a user interface and a memory including a table for storing at least menu items of the user interface. A determination is made about which user actions shall be displayed on, and communicated to the network through, the user interface. A file is read and menus and menu-items of the file are stored in the table. The user selects one of the menus, and the user-selected menu to be displayed on the user interface is detected. If the user-selected menu is either a popup or main menu, the table is consulted to get a selected menu corresponding to the user-selected menu. For each menu item corresponding to the selected menu, "is Available" is called where each such menu item is shown in a visual state of either normal or grayed-out. If normal, "actionPerformed" is called to perform the selected action. If grayed out, the actionPerformed call is bypassed. This is repeated until all of the actions have been determined.

It is thus advantageous for application programmers to use embodiments of the present invention to develop code for actions (such as, for example, displaying a dialog or performing an operation on an object such as "reboot the computer") separately from an application framework for at least the following reasons. First of all, there is a very attractive and convenient plug and play aspect of the present invention wherein functional modules can readily be added to ("plugged-into") the framework software up to runtime. These modules add functionality which the framework application software can then manifest in/on the GUI responsive to user requests ("play") in a manner that such functionality appears seamless, and not modular or discrete, to the user. This seamless appearance provides a marketing advantage for the developer over other suppliers of software having a non-seamless feel, (not to mention the plug and play ease-of-use advantage provided for the user). Secondly, upgrades to the shipped product containing embodiments of the present invention are readily made without impacting modules already in place. Thirdly, any code fixes that are required for one module will not impact another module. Only the module for which code changes are required will have to be rebuilt and relinked. Since no other modules need to be modified, development time is reduced. There are also advantages for users of embodiments of the present invention (in addition to the user advantage alluded to above), such as being able to request enhancements to their GUIs, which the developers can then supply quickly at minimal cost and with minimal disruption to current systems' operations, thus providing a convenience-advantage for users.

It is therefore a general object of the present invention to provide an improved computer system or client server network that employs a GUI.

It is another general object of the present invention to provide improved distributed management software.

It is a further general object of the present invention to provide an improved technique for generating a GUI.

It is a still further object of the present invention to provide an improved technique for creating a GUI by controlling the operative coupling between functional modules relating to user actions on the one hand and application framework software which provides infrastructure of the GUI on the other hand.

Other objects and advantages will be understood after referring to the detailed description of the preferred embodiments and to the appended drawings wherein:

DESCRIPTION OF THE PREFERRED EMBODIMENTS

Figure 1:
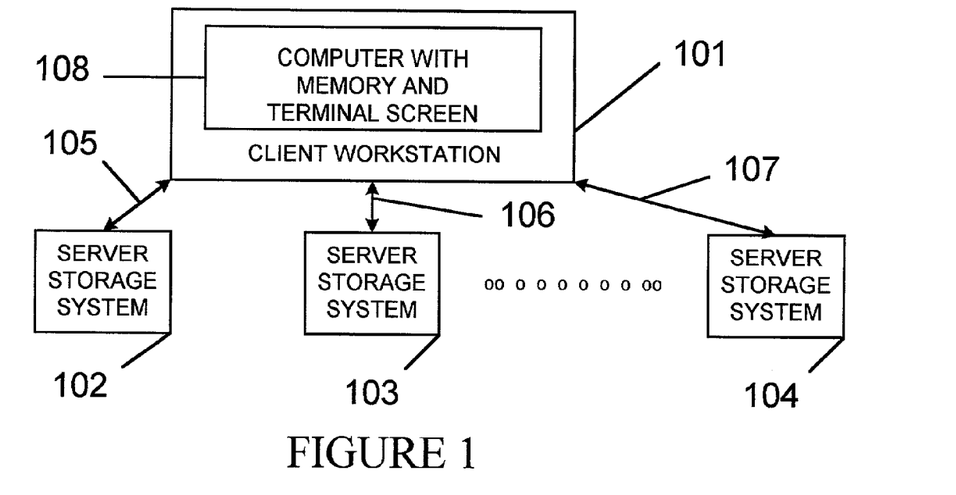
FIG. 1 is a block diagram of a client server network having multiple storage systems in which embodiments of the present invention are particularly useful.

FIG. 1—Client Server Network

Referring to FIG. 1, there is shown a block diagram of a client-server network of the type in which embodiments of the present invention can be particularly useful, although it must be understood that embodiments of the present invention can be useful in any context in which a GUI is used. Client workstation 101 contains a computer system 108 having a memory and terminal with screen. The GUI, typically includes terminal, keyboard and mouse (not shown) through which a human user can interact with the network. Client workstation 101 is connected to server and storage systems 102, 103 and 104 via bidirectional buses 105, 106 and 107 respectively. The dots between storage systems 103 and 104 are intended to imply that many more servers and storage systems can be operatively coupled to the workstation, but are not shown herein for purposes of enhancing clarity of presentation. Embodiments of the present invention are contained within client 101. A context in which these embodiments can be especially useful is within the context of distributed management software running on, and distributed throughout, this client server network. One such distributed management software product is marketed under the trademark Navisphere® management software, which is a product offering of the current assignee of the present invention. However, as noted, the present invention is not limited to this or any other specific context and can be utilized in any system in which a GUI is employed.

Figure 2:
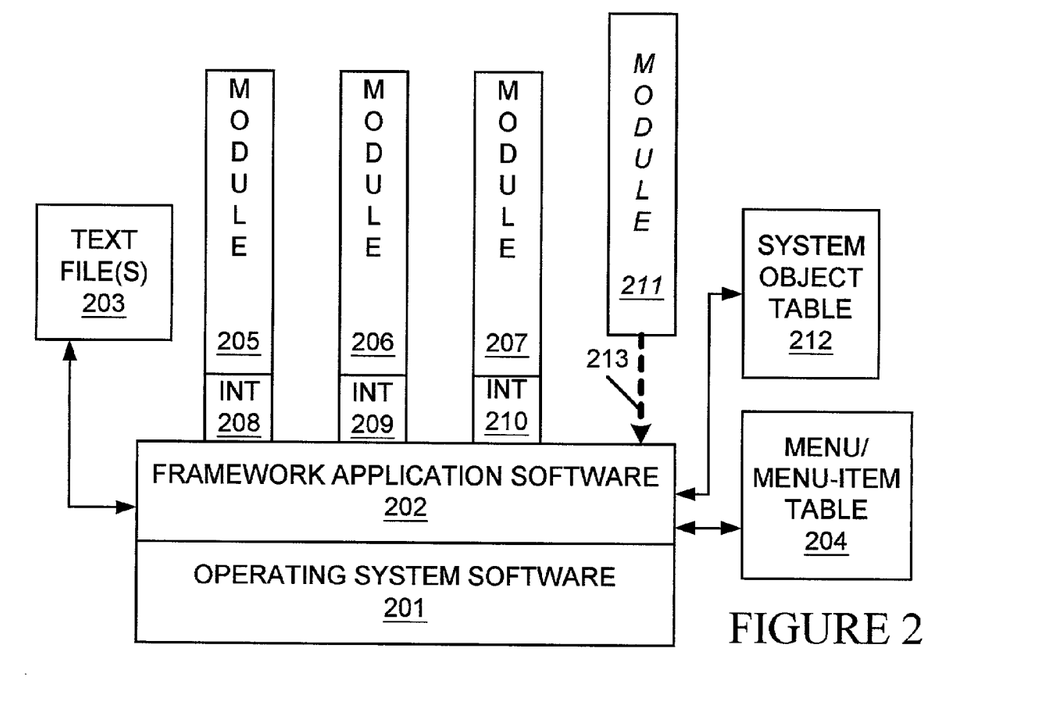
FIG. 2 is a schematic diagram of the inter-relationship between and among certain software components which are related to embodiments of the present invention.

FIG. 2—Software Schematic Overview

FIG. 2 is a schematic diagram showing an overview of the inter-relationship between and among software components related to embodiments of the present invention. It must be understood that these software components are running on computer system 108 in client 101 of FIG. 1. Operating system software 201 is shown supporting application framework software 202, or, in other words, application framework software 202 runs on operating system 201. Framework software 202 serves to provide a GUI framework or infrastructure for supporting additional GUI-related information. For example, framework software 202 provides a computer screen outline of main menu space generally located at or near the top of the terminal screen and generally disposed horizontally across the screen. Framework 202 also provides various toolbars which typically abut each other and run horizontally under the main menu space. There may be other visual infrastructure provided by the framework which, in combination with the main menu and toolbars, contributes to computer terminal screen presentations that are familiar to computer users. Menus, menu-items, toolbar buttons and other visual representations of user-controlled functions can be displayed within the framework's visual infrastructure. However, the framework software does not, by itself, have detailed GUI information about these functions; i.e. the framework software does not know what information is in the menus, or what the menu items are, or what action(s) to invoke when a particular menu item is selected by the user, etc.

To obtain this detailed information, framework software 202 is operatively coupled as shown by the bidirectional arrow to text file(s) software 203 which contains information about every possible menu and menu-item that is then being made available by software developers to users within a particular application context. [Text file(s) 203 could be one or more files, where all such information could then be contained in subsets spread over all of the files, where only certain of those files could then be available to certain users.] This menu and menu-item information, in text format, is in a language such as eXtensible Markup Language (XML). This information is sufficient to permit the computer system, under certain conditions, to ultimately manipulate each menu, menu-item, and action linked to each such menu item listed in the file in a manner to allow their respective appropriate presentations on the terminal screen under user control. XML language is a convenient language for developers to use in generating such information. XML is used to define static information, such as names of menu items, name of the action, etc. However, in order to fabricate embodiments of the present invention, another language is needed. Java is chosen for that purpose as it is used to describe the dynamic part, i.e., the action that is executed. Accordingly, framework 202 reads text file 203 and converts information from text file 203 into Java object code. These Java objects are stored in menu/menu-item table 204, shown operatively coupled by a bidirectional arrow to framework 202. Each Java object in table 204 has a corresponding entry in XML language in text file 203. In operation, these Java objects are called by the framework in response to user commands, to be discussed in more detail with respect to other figures hereinbelow.

Another table, system-object table 212, is also shown operatively coupled by a bidirectional arrow to framework 202. This table contains object information about the user's system which interfaces with the user at the GUI. (The user's system is depicted herein as a client server network, as exemplified in FIG. 1, but it should be understood that virtually any kind of computer system employing a GUI can be benefited by including embodiments of the present invention.) This table thus contains object information about the system's objects, such as, for example, disk drives, logical units (LUNs), storage processors (SPs), fans, switches, etc. Representations of these objects are displayed on the GUI, typically in an object tree format, and objects can be selected by the user by way of the usual screen cursor and mouse-click operation. Selection of such object representation from the terminal screen is sent to Framework 202 which uses it to find the appropriate and corresponding menu/menu-item object in tables 204/212, and depending on certain conditions to be described can allow a GUI display of such menu/menu-item. These certain conditions relate to functional modules, such as software modules 205, 206 and 207.

These modules represent different sets of functionality to be made available to the user. Examples of generic sets of functionality are: "Manager", "Analyzer" and "Organizer", defined as follows:

(1) "Manager" manages the system and displays its results. In the instance of a RAID storage system within a client-server network, Manager permits all basic functions of the array of disk drives, such as creating LUNs.

(2) "Analyzer" analyzes performance of the system and displays its results. Analyzer permits one to graph performance of certain objects.

(3) "Organizer" organizes files in the system and displays its results. The Organizer functional module can thus place a menu item called, for example, "Folder Management" into the main menu with an option under it called "create folder".

When a menu item for any of these functional modules is chosen or selected by the user, for example, "create folder", the framework signals the Organizer software module that the "create folder" menu item has been selected (clicked-on) and that the Organizer should do whatever it needs to do to properly respond. Similarly, the other modules would do what they need to do if one of their menu items was "clicked-on" by the user. The framework software does not have capacity to know or interpret what this or any particular menu item means, but does know that this "create folder" selected menu item belongs to the Organizer module and thus knows which module to signal for response. It should be understood that there could be many more modules plugged-in to the framework, with no theoretical upper limit, and that only three modules are shown herein as being plugged-in to enhance clarity of presentation.

Each of these functional modules must "plug-in" to the framework software through an interface, namely interfaces 208, 209, and 210. Suffice it to say in this software overview section that these interfaces are Java code software which operates between framework software 202 and any one or more of pluggable modules 205, 206, and 207 respectively. More detail is given hereinbelow about the makeup of the interfaces, and how they operate with both the modules and the framework. Also shown is a fourth module 211 which may be intended to plug in as suggested by dashed arrow 213, but is not plugged-in, as there is no interface available for module 211. More will be presented about this situation hereinbelow.

Figure 3:
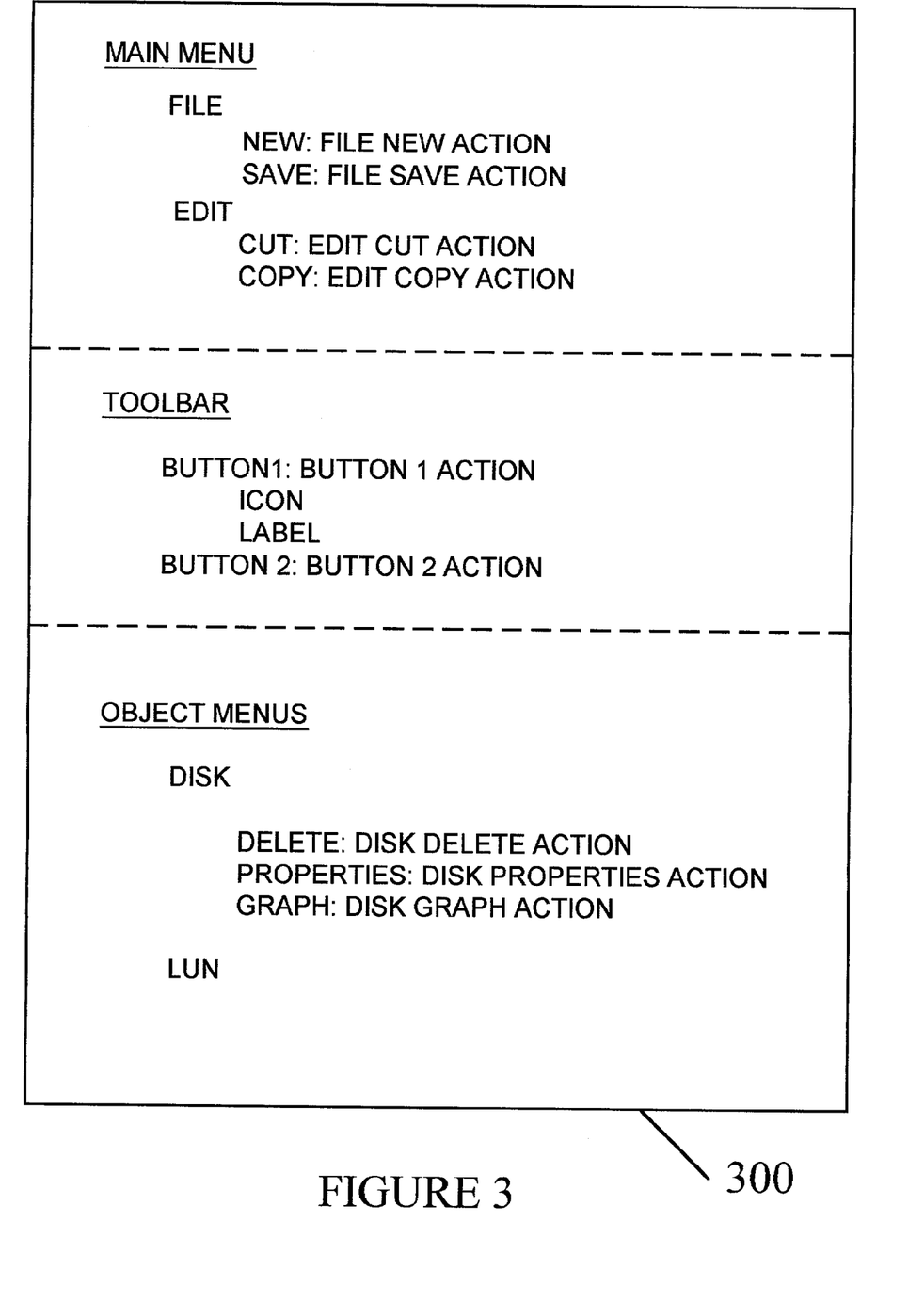
FIG. 3 is a schematic diagram of a text file stored in memory illustrating at least various menu sections, menu-items, and object class names which all relate to embodiments of the present invention.

FIG. 3—Text File

FIG. 3 is a schematic diagram of a simplified version of a text file, such as file 203 of FIG. 2, containing information stored in binary in memory and is provided herein to enhance clarity of presentation. (An actual text file portion is provided in a Table II hereinbelow, about which more will be said later.) Code written to and read from the text file by the software developers is in textual format, as, for example, in XML language, and therefore is human-readable. The text file is sequenced or ordered in a particular manner where, in this case, the "main menu" section is first, the "toolbar" section is next, and the "object menus" section is last.

There is shown in this illustration in the main menu section both a "file" menu and an "edit" menu. A main menu section can have many more entries than two, and need not have these two particular entries. Only two entries or menus are illustrated herein to enhance clarity of presentation. Thus, in the file menu there is contained both a "new" menu option or item and a "save" menu option or item. Associated with the new menu item is the name of its object class "file new action", otherwise known as the "action". Similarly, associated with the save menu item is the name of its object class "file save action", also otherwise known as the "action". In operation, the "file new action" class gets invoked (which means selected, or drafted into service) when "new" is selected by the user's left-clicking of the mouse when the cursor is pointing on the screen to "New" in the pop-up menu under the File button on the main menu. Similarly, the "file save action" class gets invoked when "save" is selected by the user's left-clicking of the mouse when the cursor is pointing on the screen to "Save" in the pop-up menu under the Save button on the main menu.

The "edit" menu can be similarly described. In the "edit" menu there is contained both a "cut" menu option or item and a "copy" menu option or item. Associated with the cut menu item is the name of its object class "edit cut action", otherwise known as the "action". Similarly, associated with the copy menu item is the name of its object class "edit copy action", also otherwise known as the "action". In operation, the "edit cut action" class gets invoked when "cut" is selected by the user's left-clicking of the mouse when the cursor is pointing on the screen to "cut" in the pop-up menu under the Edit button on the main menu. Similarly, the "edit copy action" class gets invoked when "copy" is selected by the user's left-clicking of the mouse when the cursor is pointing on the screen to "Copy" in the pop-up menu under the Edit button on the main menu.

Next, the "toolbar" section is provided in the text file. This illustration is intended to suggest a generic toolbar, and multiple toolbars are also intended to be suggested by this illustration. Thus, there could be multiple toolbar sections in the text file, one after the other, where all toolbars capable of being displayed on the screen have a corresponding toolbar entry stored in the text file. Under the particular toolbar section illustrated, two "buttons" are shown, (more than two can be used; only two are shown to enhance clarity of presentation). "Button 1" is a first toolbar button (which could be conceptualized as a menu option or item) and the name of its object class is "button 1 action". "Button 2" is a second toolbar button (which again could be conceptualized as a menu option or item) and the name of its object class is "button 2 action". Again, either class can get invoked in a manner similar to main menu operation described above, when the user clicks on the appropriate button on the screen. Under the button 1 menu option in FIG. 3 is shown "icon" and "label" which refer to specific visual means for identifying button 1 on the user interface terminal screen; typically, the icon is a small picture overlaying the button on the screen and suggesting the button's functionality, and the label is typically one-word in human-readable language also identifying such functionality, the label appearing on the screen when such button is clicked-on or highlighted by the user's mouse-cursor interaction. These buttons can be assigned specific functionality by operation of specific modules plugging-in to the framework, which operation will be discussed in more detail below.

Finally, the third depicted section is "Object Menus", which can be associated with a tree item in the tree presentation on the user interface screen. These objects are system component objects, including, for example, disk drives, storage processors, servers, LUNs, fans and other cooling mechanisms, and various nodes throughout these and other system components, etc. These objects could thus number in the multiple thousands or more for a typical client-server storage system. To enhance clarity of presentation herein, only two menus having a total of three menu options are shown, namely: "Disk" and "Lun" are shown as menus, and under the Disk menu is presented three menu options or items—"delete", "properties" and "graph". The "names of the class" or "action" for each menu item are "disk delete action", "disk properties action" and "disk graph action" respectively. The operation for invoking any of these actions is the same as earlier described with respect to the main menu operation and the toolbar operation.

A text file can contain some or all of the currently-available functionality that could be expressed on the user-interface terminal screen. Accordingly, as noted earlier, there could be different text files for different categories of customer each file having a special subset of all of the currently available functionality, or there could be one universal text file containing all currently available functionality for all customer-users. What actually gets expressed or manifested on the terminal screen, however, can be a further subset of the total functionality stored in any particular text file. This further subset is determined by which modules (see FIG. 2, modules 205, 206, 207) are plugged-in to the framework. Thus, the text file and its corresponding menu/menu-item table contain functionality as a potential availability for a particular customer through software which is installed and running on such customer's system. But, without the appropriate module being plugged into the framework, which holds the "key" to unlock such potentially available functionality, it remains hidden from the user's view and access despite being installed and running on user's system. The subject of these modules will be discussed in more detail hereinbelow.

Accordingly, this text file which is written and accessed in XML language, offers the software developers a significant degree of flexibility in their writing of code in that changes to existing text files are easily made. Thus, in the normal course of software development, if there were to be additions or deletions to any of the menus in any of the sections in the text file illustrated in FIG. 3, such additions and deletions are easily made in XML directly into the file in the proper sequence and location. Furthermore, any special functionality that may be desired by any particular user or potential user (prospective customer) can easily be added to a pre-existing text file. To make use of any such additions including this special functionality, additional modules will allow such functionality to be expressed on the user-interface terminal screen. These additional modules can be added to the pre-existing modules 205, 206 and 207 of FIG. 2. These modules and additional modules and their operation will be discussed further hereinbelow.

Framework software 202 reads text file 203 when the framework is installed and starts up. The file is read completely, from the beginning of the main menu through the last entry under the object menus. The framework saves this entire text file information in memory in Java object language by way of the menu/menu-item table 204. Thus, if main menu item "new" was selected by the user, the framework consults table 204 where a determination is made whether or not to invoke the "file new action class". As noted above, whether or not this class gets invoked is dependent upon which modules are plugged in to the framework which may be interpreted as being dependent upon which modules are appropriately interfaced with the framework.

The interface (208, 209, 210 of FIG. 2) is written in Java code and is essentially the combination of two components, namely: content of Table I hereinbelow in functional operation with content of text file 203 (as written in Java and stored in the menu/menu-item table 204).

TABLE I

INTERFACE IN JAVA CODE

```
interface INfxAction
{
    // determine whether the action is available
    boolean isAvailable( INaviObject[ ] naviObjects );
    // the action has been chosen by user, execute it
    void actionPerformed( INaviObject[ ] naviObjects );
}
```

This code of Table I contains two "methods" which are "isAvailable" and "actionPerformed". These methods and this code shall be discussed in connection with popup menus shown in FIG. 4 hereinbelow.

In connection with this discussion on text files and on the simplified text file version 300 of FIG. 3, there is further presented in TABLE II hereinbelow a print-out of an actual text file written in XML language and used in an embodiment of the present invention. This TABLE II reflects the following three sections—MAIN MENU, TOOLBAR, and OBJECT MENUS:

MAIN MENU (1) File Menu with its Login, Logout, Select Devices, New Window and Exit menu options or items; (2) View Menu with its Toolbar, Taskbar and Event Viewer Bar menu options or items; (3) Window Menu with its Cascade, Tile Vertically, Tile Horizontally and Close All menu options or items; and (4) Help Menu with its Help Topics and About menu options or items.

TOOLBAR (1) Software Installation button; (2) Help button.

OBJECT MENUS LUN (1) Set Name menu item; (2) Delete menu item; (3) Properties Menu item (4) Change Name menu item.

The Change Name menu item is italicized since it does not appear in the table, but is inserted herein to illustrate the simplicity of accomplishing an upgrade to the text file. For example, to insert this additional menu item and upgrade the text file, one merely accesses the text file and writes to it by typing on the keyboard the same syntax shown and inserts "MenuItem Label="Change Name" Mnemonic=etc., and another menu item is born in the text file.

TABLE II

TEXT FILE 203 IN XML

```
<JNfxUIPlugPoints>
    <MainMenu>
        <Menu Label="File" Mnemonic="F">
            <MenuItem Label="Login . . . " Mnemonic="L"
Action="LoginDialogAction"></MenuItem>
            <MenuItem Label="Logout" Mnemonic="o"
Action="LogoutDialogAction"></MenuItem>
            <Separator></Separator>
            <MenuItem Label="Select Devices . . . " Mnemonic="S"
```

TABLE II-continued

TEXT FILE 203 IN XML

```
Action="DeviceSelectionAction"></MenuItem>
        <MenuItem Label="New Explorer Window" Mnemonic="N"
Action="NewExplorerAction"></MenuItem>
        <Separator></Separator>
        <MenuItem Label="Exit" Mnemonic="x"
Action="ExitAction"></MenuItem>
    </Menu>
    <Menu Label="View" Mnemonic="V">
        <MenuItem Label="Toolbar" Mnemonic="T" CheckBox="true"
Action="ShowToolbarAction"></MenuItem>
        <MenuItem Label="Taskbar" Mnemonic="O" CheckBox="true"
Action="ShowTaskbarAction"></MenuItem>
        <MenuItem Label="Event Viewer Bar" Mnemonic="E"
CheckBox="false" Action="ShowEventViewerBarAction"></MenuItem>
    </Menu>
    <Menu Label="Window" Mnemonic="W">
        <MenuItem Label="Cascade" Mnemonic="C"
Action="CascadeWindowAction"></MenuItem>
        <MenuItem Label="Tile Vertically" Mnemonic="V"
Action="TileWindowVerticalAction"></MenuItem>
        <MenuItem Label="Tile Horizontally" Mnemonic="H"
Action="TileWindowHorizontalAction"></MenuItem>
        <MenuItem Label="Close all" Mnemonic="a"
Action="CloseWindowAction"></MenuItem>
    </Menu>
    <Menu Label="Help" Mnemonic="H">
        <MenuItem Label="Help Topics . . . " Mnemonic="H"
Action="HelpTopicsAction"></MenuItem>
        <Separator></Separator>
        <MenuItem Label="About . . . " Mnemonic="A"
Action="HelpAboutAction"></MenuItem>
    </Menu>
</MainMenu>
<MainToolbar Label="Toolbar">
    <Button Icon="ICON_SWINSTALL16"
Action="SoftwareInstallationAction"></Button>
    <Button Icon="ICON_HELP16" Action="HelpTopicsAction"></Button>
</MainToolbar>
<ObjectMenus>
    <Menu ForObjectType="LUN">
        <MenuItem Label="Set Name . . . " Mnemonic="S"
Action="LunActions"></MenuItem>
        <MenuItem Label="Delete" Mnemonic="D"
Action="LunActions "></MenuItem>
        <MenuItem Label="Properties . . . " Mnemonic="P"
Action="LunActions"></MenuItem>
    </Menu>
</ObjectMenus>
</JNfxUIPlugPoints>
```

Figure 4:
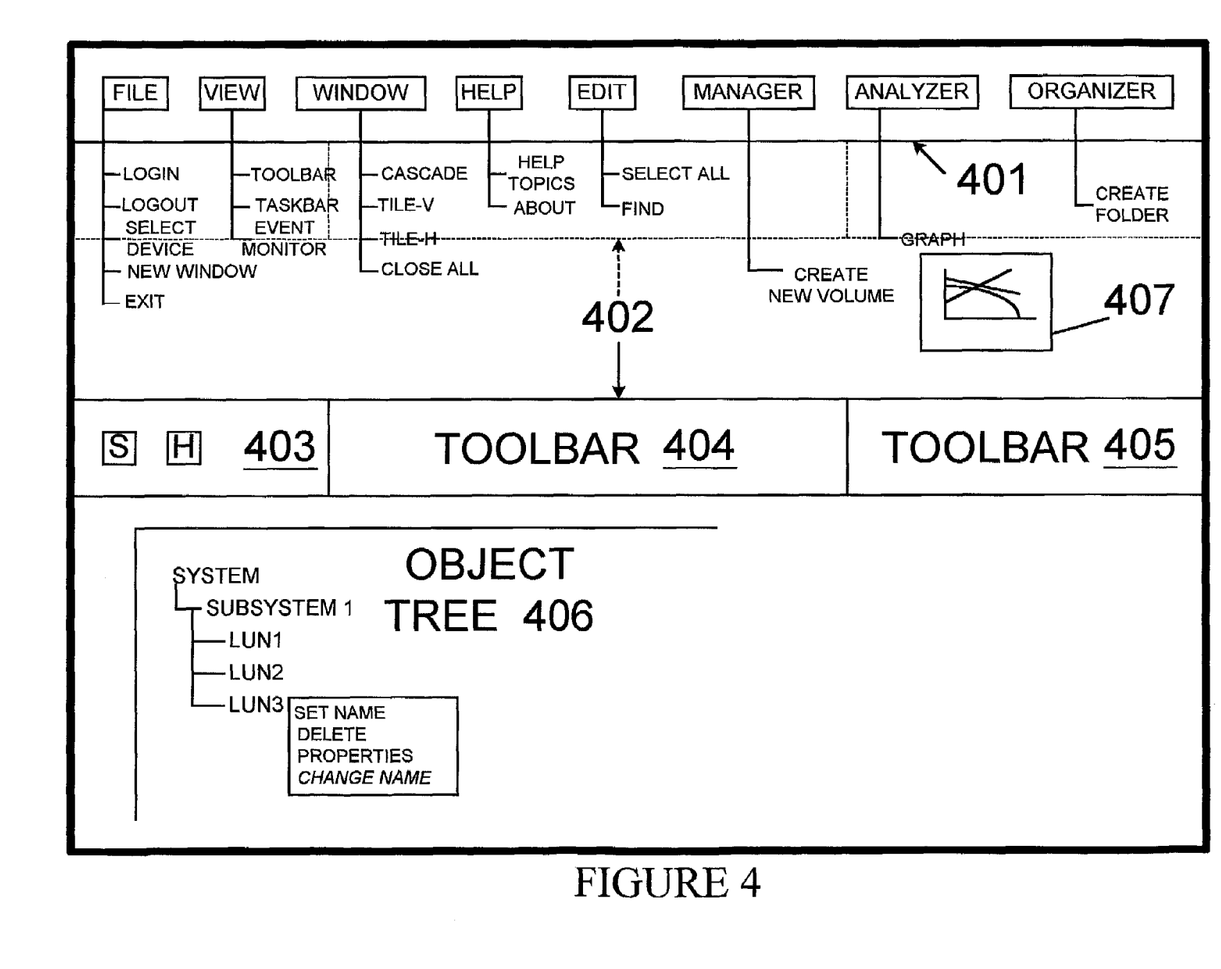
FIG. 4 is a schematic diagram of a GUI screenshot reflecting various menu options available through use of embodiments of the present invention.

FIG. 4—GUI Screenshot Schematic

There is shown in FIG. 4 a schematic diagram of a GUI screenshot reflecting various menu options available through use of embodiments of the present invention. It should be understood that all of these menu options would not be simultaneously displayed in an actual screenshot, where only one drop down menu, or only one popup menu is displayed at any given time. However, for purposes of providing a complete explanation of the operation of the present invention, FIG. 4 reflects multiple operations superimposed or displayed on the screen at the same time, which is understood to not be possible under current technology.

Referring to the upper portion of FIG. 4, main menu or main menu bar 401 is shown containing multiple menus: File, View, Window, Help, Edit, Manager, Analyzer, and Organizer. More menus and/or others could have been shown. As each of the "buttons" or "icons" or "texts" identifying these menus are highlighted by the screen cursor and left-clicked-on by operation of the mouse, its respective popup menu is displayed. Accordingly, if "File" is clicked-on, then a popup menu appears displaying the following menu items: Login, Logout, Select Device, New Window, and Exit. If "View" is clicked-on, then a popup menu appears displaying the following menu items: Toolbar, Taskbar and Event Monitor. If "Window" is clicked-on, then a popup menu appears displaying the following menu items: Cascade, Tile Vertical, Tile Horizontal, Close All. If "Help" is clicked-on, then a popup menu appears displaying the following menu items: Help Topics and About. If "Edit" is clicked-on, then a popup menu appears displaying Select All and Find. If "Manager" is clicked on, a popup menu appears displaying Create New Volume. If "Analyzer" is clicked on, a popup menu appears displaying Graph, and if the Graph menu item is highlighted and clicked on, a graph as shown may appear under certain circumstances to be discussed below. Finally, if "Organizer" is clicked-on, a popup menu appears displaying Create Folder. As noted above, only one of these popup menus can appear on the screen at any given time, but are shown in multi-display herein for purposes of providing full explanation. User selection of any one of these menu items shall be described below in connection with discussion of operation of the present invention.

Immediately below and abutting the display of the main menu on the screen is a ghost outline of a series of three toolbars, pointed to generally by reference numeral 402 with arrow in dashed-line format. These three toolbars are also pointed to generally by reference numeral 402 with arrow in solid-line format. They are shown as toolbars 403, 403, and 405, and, for purposes of enhancing clarity of presentation, are shown as being displaced from what would have been their actual locations abutting main menu 401.

Finally, also displayed on the screen is object tree 406 showing a tree of system or system component objects (object representations) which can be stored in system object table 212 or the like. Displayed are visual representations of objects for System, its Subsystem 1, and LUNs 1, 2, and 3 belonging to Subsystem 1. The Fig. reflects a popup menu associated with LUN3. (There can be a huge number of system component objects, and only a small number are shown to enhance clarity of presentation.)

The visual display of FIG. 4 maps closely to the text file of Table II. For example, the following menus: File, View, Window and Help in the main menu Bar of FIG. 4 are expressed in proper XML syntax and code in the text file of Table II. Under each of these menus in the text file is expressed their respective menu items as displayed in FIG. 4, also in proper XML syntax and code. For example, under <Menu Label="File" Mnemonic="F"> there is <MenuItem Label="Login . . . " Mnemonic="L" Action="LoginDialogAction"/>. And what follows in the text file are similar code expressions involving "LogoutDialogAction", "DeviceSelectionAction", and "ExitAction", which are reflected in the File popup menu of FIG. 4.

In next sequence, Toolbar 403 in FIG. 4 is listed in Table II, its "S" button corresponding to "SoftwareInstallationAction" and its "H" button corresponding to "HelpTopicsAction". And, thereafter, Object Tree 406 in FIG. 4 is listed in Table II as <ObjectMenus> having "SetName", "Delete", and "Properties" associated with "LunActions" which are shown in FIG. 4 associated with LUN3 in a popup menu.

In operation, referring to FIGS. 2 and 4 and to Tables I and II, a user positions the cursor on the screen over a displayed representation of an object, namely: a particular icon, button, or text. This positioning highlights the selection, and the user left-clicks on such selection causing a popup menu to occur. The following activity is manifested. On the one hand, if the user-selected object is a system object as in Object Tree 406, the framework software consults table system object table 212 and thereby identifies or obtains that object from table 212. On the other hand, if the user-selected object is a menu, the framework software this time consults menu/menu-item table 204 and thereby identifies or obtains that object from table 204. In either case, the framework software will call method #1 ("is Available") causing "INaviObject[ ] naviObjects" to become whatever object was identified from either table. If this software operation determines that the user-selected object is, in fact, available, then all of its respective menu items in its popup menu may not be greyed-out on the screen and thus all menu items will be made accessible to the user. Alternatively, some of the menu items may be greyed-out making those inaccessible by the user, where the remaining menu items which are not greyed-out are then accessible by the user. However, in the extreme circumstance, it is possible that all of the menu items can be greyed-out. If at least some of the menu items are not greyed-out and if the user then decides to execute the action by clicking on one of the menu items that are not greyed-out, the framework calls method #2 "actionPerformed". This system call again causes "INaviObject[ ] naviObjects" to become whatever object was selected by the user which, in turn, causes the software to perform whatever function is represented by that selected menu item or object. The foregoing description is applicable to any of the displayed menus, buttons, or objects 11 shown in FIG. 4.

Referring to the text file of Table II, if a product is being prepared for shipment which contains, for example, only the functionality in this text file, then toolbar 403, object tree 406, and menus: File, View, Window, and Help are all included in the shipped product. But, other menus shown in FIG. 4, namely: Edit, Manager, Analyzer and Organizer, are excluded from this shipped product. If at some point either during development, or after shipment, or any time before runtime, either developers or customer decides to include additional functionality in the product, such as Manager, Analyzer and Organizer, it can be accomplished easily through application of the present invention. For example, referring to FIG. 2, module 205 can represent Manager, module 206 can represent Analyzer and module 207 can represent Organizer. Each module is a potential XML modification to XML text file 203 which gets modified appropriately to accommodate these additional functionalities. The two "is Available" and "actionPerformed" Java code methods for each additional functionality are effectively integrated with each such modification by operation of the framework software in cooperation with text file 203 and with table 204. Each of the methods are part of a Java class. This class gets placed in a pre-determined place (directory); such place is specified in text file 203 since the name of the action class also includes a fully qualified pathname to that action class. Thus, this Java code in combination with its potential effect on modules being added into text file 203 are the equivalent of interfaces 208, 209, and 210 for modules 205, 206, and 207 respectively. In this manner, each module can be readily added to XML file 203, which, in turn, gets added to menu/menu-item table 204 when the framework reads the text file. The framework reads the text file at runtime, whereby module insertions (and/or deletions) can readily take place at any time up until runtime.

It should be noted that use is made of Java code in both menu/menu-item table 204 and system object table 212 where their objects are formulated in Java language. One reason for employing Java language at this juncture in the system is that Java has capacity to absorb such modifications at a relatively late point in the software development cycle. Java code does not become machine code until runtime and modifications cannot be made to the code after it becomes machine language or code. In other words, Java source code, which is written and understood by humans, is run through a compiler to look for source code errors and produce "bytecode" which is understood by other software called a Java interpreter. At runtime, when the system is to be run for the first time at a customer site, the Java interpreter then translates the byte code into machine language (1's and 0's) for the system's processor. Accordingly, one has until runtime to make these module insertions if Java is used. But, by contrast, if another object-oriented language, such as C++, for example, was used, then the time to make such module insertions would have been constrained to prior to compilation which occurs immediately after source code preparation and therefore occurs at a much earlier stage in the software development cycle.

Next, considering module 211 of FIG. 2, it is shown with dashed arrow 213 pointing to framework 202 to imply that one may wish to insert such module as yet another addition to text file 203. No interface is shown to accommodate module 211 in FIG. 2. Thus, if such attempt is made after runtime, such insertion is not available, whereby no interface would exist. Also, even if before runtime, if a choice is made not to allow such insertion, then no interface would exist. Referring to FIG. 4, if the Edit menu located in the main menu Bar is assumed to be directly derivable from Module 211 and is displayed on the screen as shown in FIG. 4, then it must be concluded that at some point an appropriate interface for module 211 was set in place in accordance with discussions above relating to the other modules.

In accordance with the above description, any menu in the main menu Bar or any toolbar button such as "S" or "H" in toolbar 403 (other toolbars not showing any buttons), or any object in object tree 406 could be clicked-on, and the above-described action would be set in motion. In any particular instance, the resulting popup menu items may be full or partially greyed-out, or not greyed-out at all as a function of the state of each such item's interface. For example, if Analyzer is selected by the user which provides the "graph" menu item, and if such menu item is available and is selected, the user then executes an action resulting in graph 407 being displayed to illustrate results of some analysis such as, for example, a state of system performance. For another example, if the "System" is being queried by the user producing object tree 406, and if LUN3 is available and clicked-on, a popup menu showing "Set Name", "Delete", and "Properties" is shown. Any of these menu items could be chosen to be executed by the user if not greyed-out. "Change Name" is shown in FIG. 4 as italicized since it does not appear in the text file of Table II. However, it could easily be added to the text file as described above.

Figure 5:
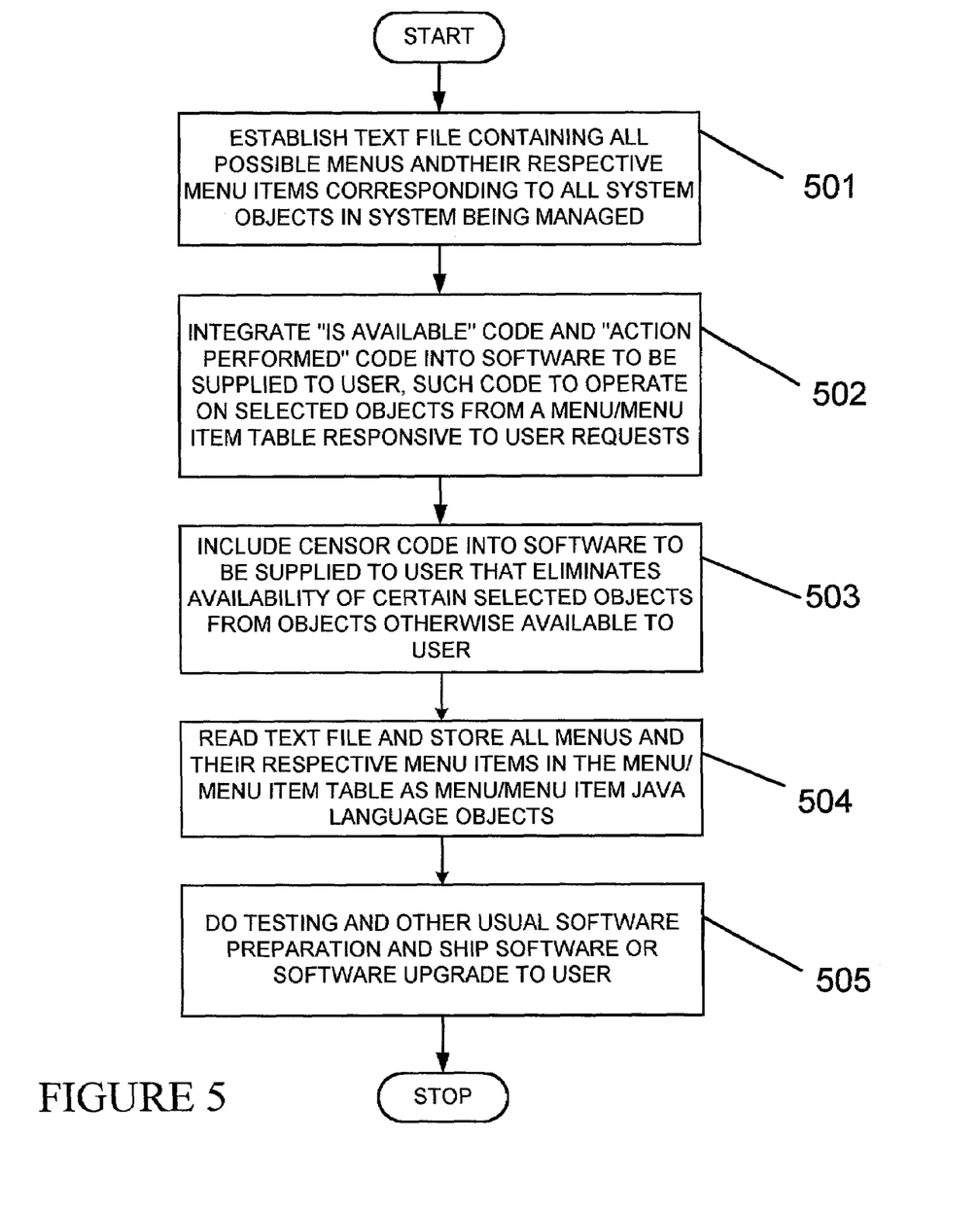
FIG. 5 is a flowchart of operation of embodiments of the present invention in context of usage by software programmers; and, FIG. 6 is a flowchart of operation of embodiments of the present invention in context of usage by a customer-user.

FIG. 5—Flowchart—Developer's Operation

FIG. 5 is a flowchart of operation of embodiments of the present invention in context of usage by software programmers. In step 501, a text file is established containing all possible menus and their respective menu items corresponding to all system objects being managed in the system. In other words, a text file such as, for example, text file 203, 300, or that shown in Table II is established. This is prepared in textual format as shown. All developers in the development team can contribute to this text file as it is being developed. All system objects of interest, which in the management of a storage system could number in the thousands of objects and more, can be included in such a text file. As noted, this file could be a multiplicity of files, each containing a subset of the total number of possible menus and menu items.

Next, in 502 the Java interface code "is Available" and "actionPerformed" is integrated into the software to be supplied to the user. As noted earlier, although these methods are part of a Java class, they have a pre-determined place specified in XML text file 203 because the name of the action class also includes a fully qualified pathname to that action class. Such code shall operate on selected objects identified in a menu/menu-item table consulted by the framework software responsive to user requests. Then, in step 503, additional code for censoring is included by the developers into the software to be supplied to the user which eliminates availability of certain selected objects from objects otherwise available to the user. This censoring results in the user not even being aware that such an object exists since such object is not displayed on the terminal screen. This feature permits the developers to uncensor such features at predetermined future times and release such features as product enhancements without having to put more than minimal effort into any such software upgrade release at the time of its release.

Next, in step 504 the text file is read and all menus and their respective menu items are stored in menu/menu item table 204 as menu/menu item Java language objects. And, the last step 505 allows for testing and other usual software preparation prior to shipment of software or a software upgrade to the user.

Figure 6:
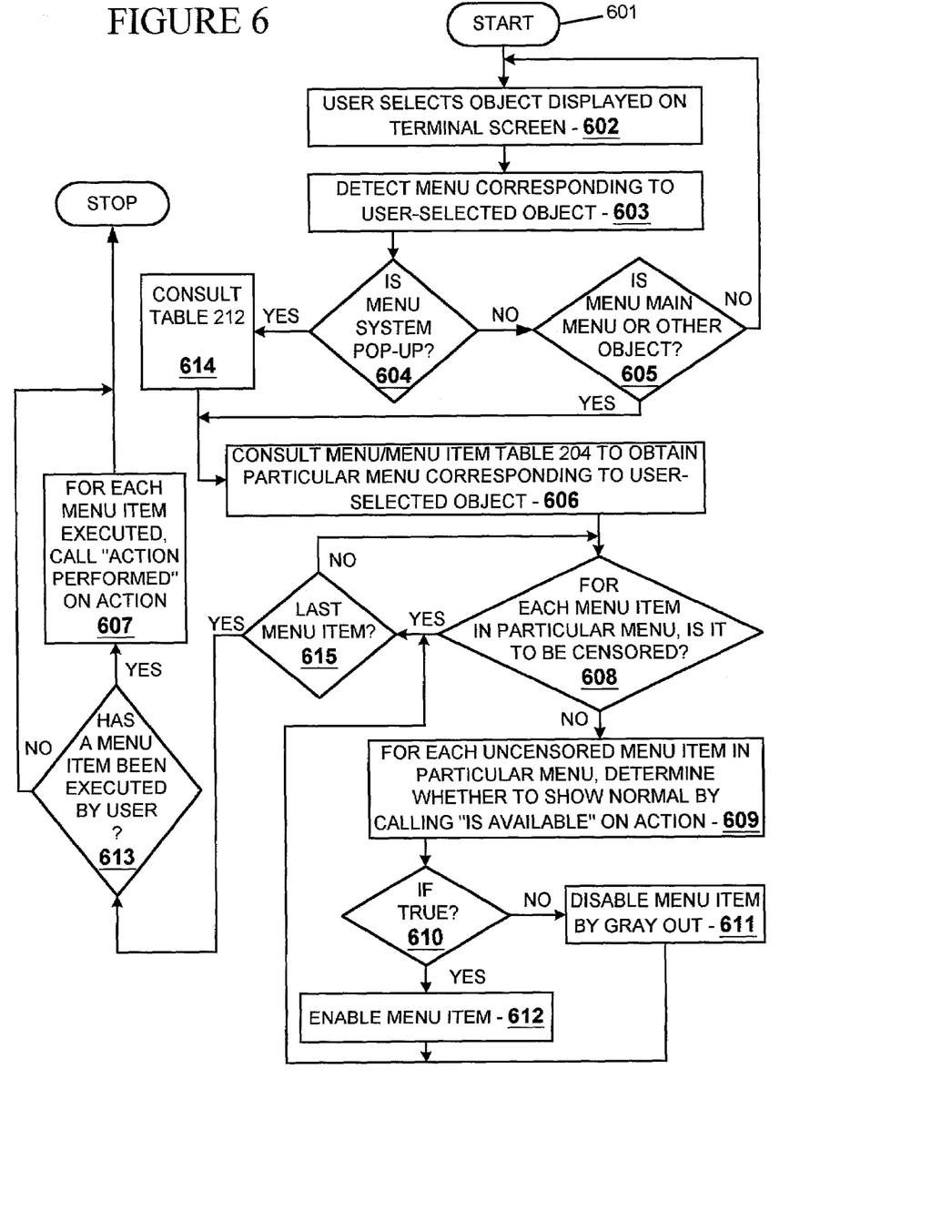

FIG. 6—Flowchart—User Operation

FIG. 6 is a flowchart of operation of embodiments of the present invention in context of usage by a customer-user. After the software is prepared in accordance with the steps of FIG. 5, the user receives it, installs it, and makes it operational. This is runtime. The algorithm starts at tab 601. In step 602 the user selects an object, either a toolbar button, a system object, a menu text button in the main menu, or some other object as displayed on the terminal screen. In step 603, the menu corresponding to the user-selected object is detected. The algorithmic process then moves to step 604 wherein the query is made: is the detected menu a system popup menu (e.g., associated with a system object as shown in object tree 406)? If not, a further query is made: is the detected menu the main menu or some other object like a toolbar button? If not, then an appropriate menu was not detected and the algorithmic process returns to step 602 and repeats—the user selects another object on the terminal screen. However, if the detected menu from block 603 was a system popup menu the algorithmic process moves from block 604 to block 614 where system object table 212 is consulted after which menu/menu-item table 204 is consulted in step 606 to obtain the particular menu corresponding to the user-selected object. By comparison, if the detected menu was a main menu or some other object, the "yes" output from decision block 605 moves the algorithmic process directly to step 606. In other words, if the detected menu was associated with a system object in object tree 406, (a system popup menu) initially system object table 212 and then menu/menu-item table 204 are consulted by the framework to obtain a Java-coded particular menu corresponding to the user selected system object. But, if the detected menu is a main menu or some other non-system object, then menu/menu-item table 204 is consulted directly by framework 202 to obtain such Java-coded particular menu.

Next, in step 608 the question is asked: for each menu item in such particular menu, is such item to be censored? If the answer to this question is "yes", another decision block 615 asks if this is the last menu item in the selected particular menu. If the answer to the question in decision block 615 is "no", the function of block 608 is repeated for other menu items, but if "yes" the algorithmic process moves ahead to block 613 discussed hereinbelow. The question in decision block 608 is repeated until all menu items in the selected particular menu have been queried. For a system object, even if all menu items in the particular menu are to be censored, the system object will be viewable on the terminal screen anyway, since system objects need to be shown. But, for a non-system object, if all menu items associated with such non-system object such as a text button object in main menu 401 were censored, then such button would not appear on the screen. Such text button could then be provided (made visible) at a subsequent time, as, for example, when a software "upgrade" is provided by the software developers.

Next, in step 609, for each uncensored menu item in the particular menu, a determination is made whether to show that menu item as normal or grayed-out by the framework software calling method #1, "isAvailable" on that action. On the one hand, in step 610, for each uncensored menu item for which that is true, such menu item is enabled (not grayed-out) in step 612. On the other hand, in step 610, for each uncensored menu item for which that is not true, the "no" arrow brings the algorithmic process to step 611 to "gray-out" or disable each such menu item. In either case, whether enabled or grayed-out, the algorithmic process loops back to query block 615 where the query is posed: is this the last menu item in the particular menu that was selected? If "no", then the operation of block 608 is repeated with possible repetition of operation of blocks 609, 610, 611, and 612; but, if "yes", then the algorithmic process moves ahead from block 615 to block 613.

In block 613 the question is posed: has a menu item been executed by the user? In other words, for any one or more menu items in the particular menu, has the user left-clicked-on an enabled menu item, one that was made available to the user to click-on (a non-grayed-out menu item which the user is permitted to click-on)? If "yes", the process moves to block 607 and the framework calls "actionPerformed" on the action for each menu item executed. (In most cases, only one menu item can or shall be executed or clicked-on in a selected particular menu, but it may be possible that more than one menu item in the same particular menu can be executed under certain conditions.) In this affirmative case, the software (including whatever module, such as modules 205, 206, 207, etc. of FIG. 2, associated with each clicked-on menu item) performs its required task in response and the process stops. But, if "no", then no menu items were clicked-on or executed by the user, step 607 is bypassed, and there is no "action performed" called on any of the menu items in the particular menu selected by the user. In this negative case there is no resulting action performed and the process again stops. (Note that if all menu items in the particular menu are disabled or grayed-out via step 611, then step 613 necessarily produces a "no" result). The process begins anew at block 602 if and when the user selects the next object of interest.

The present embodiments are to be considered in all respects as illustrative and not restrictive. The flowcharts used herein to demonstrate various aspects of the invention should not be construed to limit the present invention to any particular logic flow or logic implementation. The described logic may be partitioned into different logic blocks, (e.g., programs, modules, functions, or subroutines) without changing the overall results or otherwise departing from the true scope of the invention. For example, as noted, there could be multiple text files, each containing a different subset of objects, where each of the different text files could be useful in different contexts respectively, and where the appropriate text file is automatically selected for the appropriate context, etc. The present invention may be used wherever a GUI is utilized, in any application, and may be embodied in many different forms, including, but not limited to, computer program logic for use with any kind of processor, programmable logic for use with any kind of programmable logic device, discrete components, integrated circuitry including application specific integrated circuits (ASICs), or any other means including any combination thereof. Computer program logic implementing all or part of the functionality described herein may be embodied in various forms, including, but not limited to, source code form, computer executable form, and various intermediate forms (e.g. forms generated by an assembler, compiler, linker, or locator.) Source code may include a series of computer program instructions implemented in any of various programming languages for use with various operating systems or operating environments. The source code may define and use various data structures and communication messages. The source code may be in computer executable form, or it may be in a form convertible into computer executable form. The computer program may be fixed in any form either permanently or transitorily in a tangible storage medium, such as a semiconductor memory device, a magnetic memory device, an optical memory device, a PC card, or other memory device. The computer program many be fixed in any form in a signal that is transmittable to a computer using any of various communication technologies including, but not limited to, analog, digital, optical, wireless, networking, and internetworking technologies. The computer program may be distributed in any form as a removable storage medium with accompanying printed or electronic documentation, preloaded with a computer system (e.g. on system ROM or fixed disk), or distributed from a server or electronic bulletin board over the communication system (e.g., the Internet or World Wide Web).

The method, system, and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a general purpose computer or processor, the machine becomes an apparatus for practicing the invention because the program code combines with the machine to provide a unique apparatus that operates analogously to operation of specific logic circuits. Methods and apparatus of the present invention may also be embodied in forms of program code that are transmitted over a transmission medium, such as over electrical wiring or cabling, through fiber optics, or via any other transmission medium.

Furthermore, applications for embodiments of the present invention are not limited to computer storage system environments. For example, embodiments of the present invention are applicable to a wide-ranging list of arenas such as medical applications, or space program applications, or any arena where menus and toolbar buttons on a GUI are being used and would benefit from the plug and play techniques disclosed and claimed herein. Therefore, the scope of the invention is indicated by the appended claims rather than by the foregoing description, and all changes which come within the meaning and range of equivalency of the claims are therefore intended to be embraced therein.

What is claimed is:

1. In a computer system having a processor and a graphical user interface, a plug and play interface for user actions enabling software developers of said plug and play interface to implement certain graphical user interface code changes before runtime, said plug and play interface comprising:

framework means for providing infrastructure for said graphical user interface and to support information about every possible one of said user actions;

module means, pluggable into and un-pluggable from said framework means for providing at least some of said information;

means for establishing before said runtime an XML text file containing said information about said user actions;

said framework means including means for reading before said runtime said file to obtain certain of said user actions to be implemented, said certain of said user actions being determined by said some of said information; and, means for permitting said user to execute during said runtime a portion of said certain of said user actions through operation of said graphical user interface, said portion being determined by said some of said information.

2. The plug and play interface of claim 1 and wherein said file establishing means includes means for establishing a plurality of files containing a like plurality of subsets of said information respectively, where totality of said subsets of said information encompasses said every possible one of said user actions.

3. The plug and play interface of claim 1 wherein said computer system is included within a client-server network.

4. The plug and play interface of claim 1 wherein:

said computer system has memory including at least one table;

said file reading means includes:

censoring means to censor other than said certain of said user actions to be implemented; and means for storing said certain of said user actions to be implemented in said at least one table and formulated in JAVA language; and said user permitting means includes means, operating on said graphical user interface, for graying-out other than said portion of said certain of said user actions.

5. A method for manufacturing graphical user interface software employed in a computer system to be utilized by a user, said method to be implemented prior to runtime and comprising:

establishing, before runtime, a text file containing both all possible menus of said graphical user interface and their respective menu items, said all possible menus corresponding respectively to all system objects in said system;

integrating, before runtime, first code and second code into said software to be supplied to said user, said first and second code to operate on selected objects responsive to requests from said user;

including, before runtime, censor code into said software that eliminates availability of certain of said selected objects;

reading, before runtime, said text file to obtain said menus and to obtain said their respective menu-items;

storing, before runtime, said menus and said their respective menu-items as Java language objects; and, testing and preparing, before runtime, said software for shipment to said user.

6. The method of claim 5 and wherein said text file is written in XML computer language.

7. The method of claim 6 and wherein said first code is Java is Available code and said second code is Java action-Performed code.

* * * * *